Nov. 23, 1965          J. A. HASTINGS          3,219,295
TRIPLE SAFETY CONTROL SYSTEM
Filed July 10, 1963
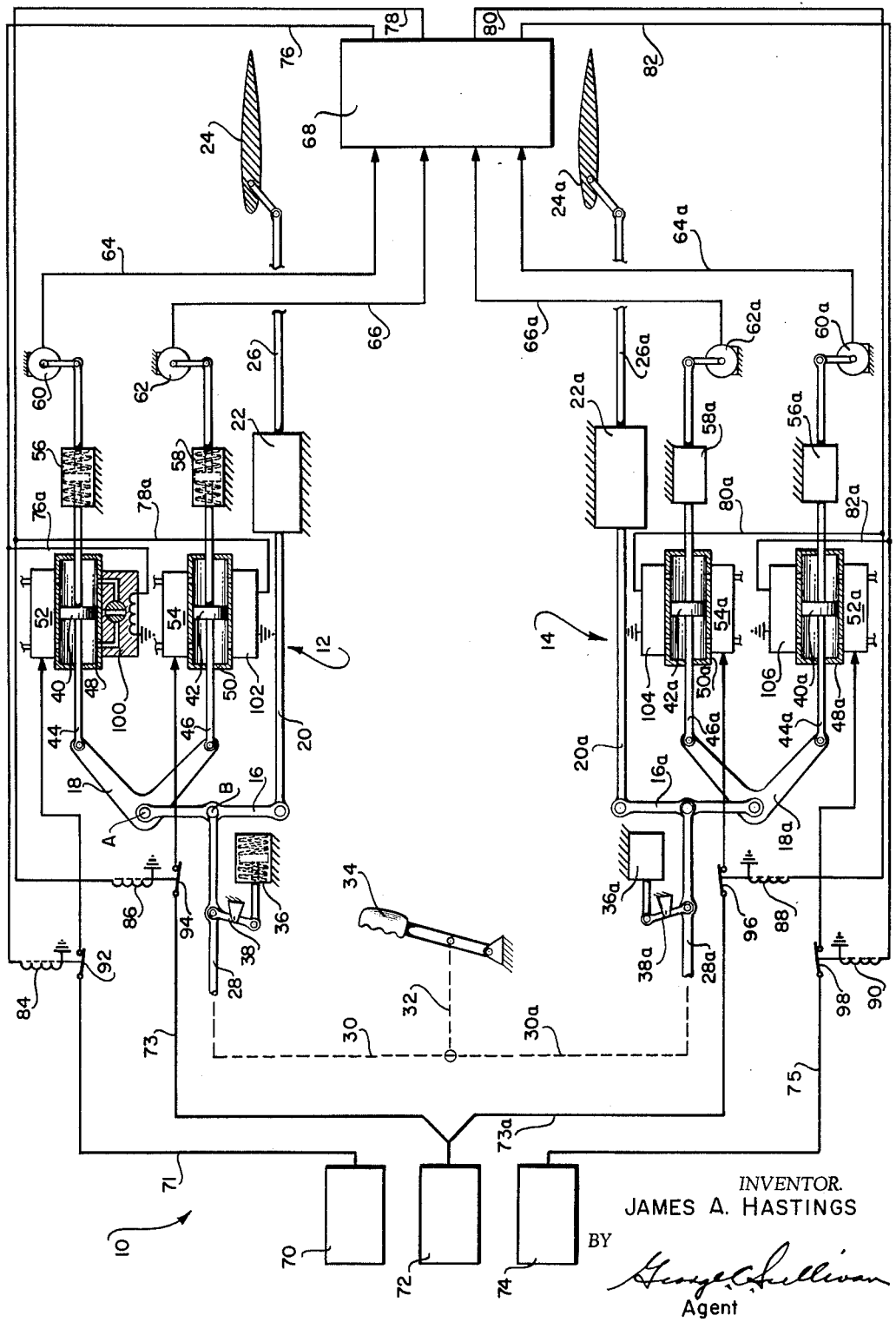
INVENTOR.
JAMES A. HASTINGS
BY
George C. Sullivan
Agent

United States Patent Office 3,219,295
Patented Nov. 23, 1965

3,219,295
TRIPLE SAFETY CONTROL SYSTEM
James A. Hastings, Burbank, Calif., assignor to Lockheed
Aircraft Corporation, Burbank, Calif.
Filed July 10, 1963, Ser. No. 294,057
10 Claims. (Cl. 244—77)

This invention concerns the provision of flight control system redundancy. More particularly, it concerns means and method for triplicating autopilot contol means and monitoring servo outputs for the detection and isolation of component malfunction.

In many applications successful, uninterrupted operation of automatic flight controls is necessary to effectively accomplish the assigned mission and to maintain safe flight conditions. Means must also be provided to assure continued normal system operation in the event of failure of automation components, thereby assuring that occurrence of the failure itself does not create a hazard.

Although its application is not so limited, the invention herein described is of particular significance when applied to high-performance aircraft. It has been standard practice in achieving a so-called "fail-safe" system, to provide dual redundancy. Such redundancy is accomplished by using two parallel channels in the control system. This results in an identification of the presence of a fault (by comparison of the two outputs), but it is not adequate to determine which of the channels is faulty. Hence, a determination is made that a failure has occurred; however, the pilot is required to locate the failure channel by trial and error procedures. When time is a critical factor, the frequent result is a mission failure.

In order that a malfunction may be isolated after its detection a minimum of three parallel channels is required. Although attempts have been made to achieve the required three channel system of redundancy, current techniques have not achieved the objective within reasonable boundaries of complexity and performance. For example, triple servo designs have required linkage complexity with resulting friction, backlash and inertia problems, and incompatibility in basic hydraulic system power design. The use of a dual servo plus a so-called "model" which simulates a third servo has also resulted in the noted disadvantages, plus the additional disadvantage of difficulty in achieving good simulation by the model. Other attempts have met with similar shortcomings.

A primary objective of the present invention is to provide a relatively simple triplicating system for failure detection in automatic flight control systems with a minimum of friction, backlash, inertia and related problems.

Another object of invention is to provide the means and method for detecting a control system failure and for automatically identifying and isolating the faulty component therein.

A further object is to provide a triple-system safety in an automatic flight control system through the provision of dual controls for each of two control surfaces and means for comparing outputs of each for malfunction detection and isolation.

A still further object of invention is to achieve a hitherto unknown margin of safety in high-performance aircraft through the application of a simplified automatic control system having triple redundancy.

The objects of invention are accomplished in the present invention by providing a "fail-operational" or triple servo system with duplication of components similar to those found in the "fail-safe" servo systems.

The system utilizes the outputs from three parallel autopilot channels. These channels, one of them being common to both control surfaces utilized in controlling a single flight maneuver, e.g., the ailerons for roll control, and two being independent, i.e., one channel to each surface, actuated the control surfaces through appropriately positioned modulating pistons. Sensors measure the individual deflections of the modulating pistons and supply information to a monitor which compares the signals. The failure of one channel results in a detection of the failed channel by the monitor through a majority rule procedure and an automatic isolation of that channel to assure normal operation of the control surfaces irrespective of such failure.

Through the utilization of the system described and claimed herein the objects of invention are accomplished in accordance with the description of this invention and as illustrated in the accompanying drawing in which:

The figure is a schematic representation of the system of the invention.

The present system, as illustrated in the accompanying drawing, includes a pair of dual servo systems which are combined in a manner to achieve the triple system redundancy necessary for automatic detection and isolation of malfunction in providing the desired safety characteristics. The overall system is therein designated by numeral 10 and the dual systems or servo controls are designated by the numerals 12 and 14. In order to provide an understanding of the complete system it is first necessary to understand the dual control portions 12 and 14. Since the dual control portions are identical to one another the components of dual control portion 14 will be designated as the counterparts of the dual control portion 12 components by the letter $a$.

The dual control means 12 comprises a power link 16 having one of its ends pivotally connected to a bellcrank 18 centrally of the crank. A second end of the power link 16 is connected to a rod 20 leading through a power servo 22 which is adapted to actuate a control surface 24 through an appropriate linkage 26. The power servo 22 may be any one of a number of commercially available servo boosters, its function being to provide sufficient power to overcome control surface resistance resulting from wind resistance, etc., which normally requires forces in excess of those which a pilot is capable of exerting. The power link 16 is also pivotally connected approximately centrally thereof to a control link 28 which is connected through appropriate links 30 and 32 to a pilot's control stick 34. A stick spring cartridge 36 of conventional design is affixed to structure on the aircraft and connected to the control link 28 through an intermediate link 38 for normally retaining pivot point B of the power link 16 in a predetermined position.

Opposite ends of the bellcrank 18 are respectively connected to the pistons 40 and 42 of a pair of hydraulic modutalors through a pair of piston rods 44 and 46. The modulator pistons 40 and 42 are disposed within their respective cylinders 48 and 50 and their positions therein are controlled by means of a pair of conventional electrohydraulic transfer valves 52 and 54, each forming a portion of the respective modulator. The ends of piston rods 44 and 46 opposite their connection to the bellcrank 18 are respectively connected to a pair of modulating piston spring cartridges 56 and 58. These spring cartridges, which are similar in design and operation to the spring cartridge 36, tend to maintain the modulator pistons 40 and 42 in their neutral positions.

The spring cartridges 56 and 58 are connected to a pair of sensors or signal generators 60 and 62 which detect the specific positions of their interconnected modulating pistons and provide an output signal via electrical conduits 64 and 66 to a monitor 68.

By virtue of the action of the spring cartridges 56 and 58 the pivot point, designated as point A and which is the pivotal connection between the power link 16 and the bellcrank 18, is held at a neutral point until such time as outside forces overcome the action of the spring cartridges. The pivot point A acts as a fulcrum about which the power link 16 moves responsive to movement of the control stick 34. Therefore, as the control stick movement overcomes the action of the stick spring cartridge 36 the power link 16 is rotated about point A. Its movement causes actuation of the power servo 22 which, in turn, causes movement of the control surface 24 through the linkage 26 in an amount corresponding to the control stick movement.

Standard dual control systems usually include parallel automatic pilot channels such as those herein identified by numerals 70 and 72, respectively, and are connected by means of lines 71 and 73 to the transfer valves 52 and 54. Inputs from the automatic pilot channels to the transfer valves control the flow of hydraulic fluid to the modulating pistons, causing their movement in proportion to the level of the electrical signals generated by the automatic pilot channels. Such movement is transmitted through the piston rods 44 and 46 to the bellcrank 18. By virtue of the holding power of the stick spring cartridge 36 force transmitted to the power link 16 by translatory movement of the bellcrank 18 causes rotation of the power link 16 about a pivot point B intermediate of its ends, thereby causing actuation of the control surface 24 through actuation of the power servo 22 in the manner heretofore described. Hence, the control surface 24 assumes a resultant position proportional to the sum of the changes in position of the control stick and the modulating pistons.

Since the positions of the modulating pistons represent the qualatative result of automatic pilot operation in the respective channels, a comparison of the positions of the modulator pistons 40 and 42, influenced separately by identical auto-pilot channels, constitutes the criterion of failure of the respective channels. If the instantaneous position of each modulating piston is identical to that of the other modulating piston neither channel is malfunctioning. Conversely, if the instantaneous positions of the pistons differ it is an indication that one of the channels is malfunctioning. Malfunction at any point in the system, whether it be in the autopilot channels, the linkages, the hydraulic equipment, etc., is thereby detected.

The present invention utilizes each of the described components of a dual control portion 12 in addition to an identical set of components comprising the second dual control portion 14. The portion 12, when applied in accordance with the present invention, is interconnected with its identical counterpart 14 such that each of control portions 12 and 14 is attached to a separate control surface. Alternatively, where a single control surface such as a rudder is utilized, the dual control portions 12 and 14 are attached at or near opposite ends of that control surface. In the latter event, a nominal torsional moment and slight deflection results. Therefore, the invention may be utilized for virtually any single surface control structure due to its inherent ability to accept torsional moments. It is sometimes desirable that a control surface such as a rudder be split to form dual control surfaces in order that such torsional moments are not detrimental.

A third automatic pilot channel 74 is placed in parallel with channels 70 and 72. It provides an output to transfer valve 52a via conduit 75 which is identical with those of channels 70 and 72. The channel 72 also includes a conduit 73a leading to the transfer valve 54a to provide a signal identical to that supplied to the transfer valve 54.

This complete system results in means whereby the automatic pilot is enabled to operate the flight control surfaces through the use of the dual modulating piston arrangement associated with each control surface. However, the control of such dual arrangements through utilization of the third autopilot channel in parallel with the two channels normally utilized results in a triple-system protection and a discriminating capability of which prior art systems were not capable of providing.

Assuming that the dual control portions 12 and 14 are connected to opposite ailerons for roll control, the four modulator pistons, 40, 40a, 42 and 42a (two at each aileron) co-act in identical manners to accomplish the roll control. The outputs from the three parallel channels of the autopilot control the positioning of all four modulating pistons, the autopilot channel 72 controlling both of modulator pistons 42 and 42a. Each of the channels 70 and 74 is connected to only one of the modulating pistons, in this instance pistons 40 and 40a, respectively. In determining whether a malfunction exists during the operation, the outputs of the modulating piston position sensors 60, 60a, 62 and 62a are compared. All outputs must be equal, otherwise a malfunction exists. More specifically, the output of the position sensor 60 is continuously compared with those of the sensors 62 and 60a. Should the outputs of sensors 60 and 62 differ from one another, a failure is presumed to have occurred. Through a mutual comparison of the outputs of sensors 60, 62 and 60a, the failed channel is identified by majority rule. Similarly, in the event that the outputs of sensors 60a and 62a differ from one another a malfunction has occurred with respect to one of these channels. By mutual comparison of outputs from the sensors 60, 60a and 62a the failed channel is identified. Commonly known control circuits within the monitor 68 are employed to automatically isolate the faulty channel and modulating piston from further electronic signals and hydraulic power.

Once it has been determined that a particular channel has failed, the monitor 68 acts to automatically cause that channel to be isolated from the balance of the system. For this purpose isolation means connected to each of the channels is controlled by the monitor 68. A series of electrical conduits 76, 78, 80 and 82 leading from the monitor 68 are connected to control a series of cut-off relays 84, 86, 88 and 90, respectively, attached to the respective switches 92, 94, 96 and 98 in the lines 71, 73, 73a and 75 for disconnecting the inputs to the transfer valves responsive to signals from the monitor 68. Branch conduits 76a, 78a, 80a and 82a are connected to solenoid-controlled by-pass valves 100, 102, 104 and 106 for controlling the by-pass of hydraulic fluid from one side of the various modulating pistons to the opposite sides, thereby permitting the modulating pistons to return unhindered to neutral position and permitting isolation of the mechanism within which it is disposed. It is seen that it is desirable to permit the modulating piston to return to its neutral position to maintain control surface trim. However, a jammed modulating piston ( a rare type of failure) which cannot be returned to neutral nevertheless does not alter the fault detection and disengage sequence, but may require some retrimming of the control surface.

Utilizing a monitor of a commercially available type similar to that described in a paper entitled "Control of VTOL Aircraft" presented on September 14, 1961 by Short Brothers and Harland, Ltd. at the Eighth Anglo-American Aeronautical Conference in London, England, the discriminating comparisons described above are accomplished. Signals are provided via selective ones of the conduits 76, 78, 80 and 82 to their respective cut-off relays and by-pass valves in the event of failure within particular ones of the channels. For example, assuming that the monitor 68 determines the channel controlled by autopilot portion 70 to be faulty, a signal is supplied via the line 76 to the cut-off relay 84 and the by-pass valve 100. This signal causes the switch 92 connected to the cut-off relay 84 to be opened, thereby preventing further controlled excitation of the transfer valve 52 and resultant actuation of the modulator piston 40, with its associated structure. Simultaneously, the by-pass valve 100 is caused to open, permitting a free by-pass of fluid between the opposite sides of the piston 40. This prevents the piston 40 from interfering with controls operation responsive to signals from autopilot portion 72 and actuation by the modulating piston 42 and its associated structure. The piston 40 then becomes irresponsive to false electrical or hydraulic pressures, is permitted to return to its neutral position by virtue of spring cartridge 56, and thus exercises no measure of control over the system.

Since the system is fundamentally a three channel system (although two dual outputs are uniquely employed for reasons discussed elsewhere herein) it is necessary to limit the number of channel disengagements responsive to monitor 68. As a generalization, only one channel disengagement in a three channel system should be permitted to occur automatically since fault discrimination of the two remaining channels would not be inherent. Therefore, monitor 68 (in accordance with the teaching of the Short Brothers and Harland, Ltd. article, cited above) includes interlocking relays leading to the output lines 76, 78, 80 and 82 for the purpose of preventing disengagement of more than one channel at a time. For example, should the monitor 68 determine that the channel controlled by autopilot portion 70 is faulty, a signal is supplied to the interlock relay associated with output line 76. Energizing the coil of this relay (concurrent with the disengagement of the channel associated with autopilot portion 70) causes its contacts to open, thus breaking continuity to lines 78, 80 and 82 such that the channels associated with these lines are not subject to subsequent disengagement. Since the monitor output lines 78 and 80 are both associated with a common autopilot portion 72 the interlock relay circuit permits both lines 78 and 80 to be energized simultaneously, thereby providing appropriate channel disengagement should a fault occur in autopilot portion 72.

The same isolation sequence takes place with respect to the various other channels in the event they are determined to be faulty in any respect.

Hence, through the use of a dual servo associated with each control surface, appropriately excited by outputs from a triple channel autopilot, and the use of commonly known monitor circuits, a method and means of not only sensing the presence of failure, but determining the specific channel which has failed and isolating that channel from the balance of the system is achieved.

While a system portion for controlling only one parameter of aerodynamic motion has been described, it is to be understood that a system for complete aircraft control includes similar components for controlling ailerons, elevators and rudder. Complete roll, pitch and yaw control are thereby provided.

What is claimed is:

I claim:

1. A triple safety control system for automatic pilot-controlled aircraft comprising:
   (a) a pair of dual control means connected to each control surface upon an aircraft and adapted to control their positions responsive to automatic pilot inputs thereto;
   (b) three automatic pilot channels connected in parallel so as to provide identical control outputs, each of two of said channels being connected to one portion only of opposite ones of said dual control means, a third one of said channels being connected to the other portion of each said pair of control means;
   (c) signal means connected to each said control means portion for providing signals responsive and proportional to the movements of said control means portions;
   (d) a signal monitor connected to said signal means for receiving and comparing such signals, determining faulty operation and providing an output signal to indicate the existence of fault; and
   (e) isolation means for isolating faulty operating system portions responsive to signals from said monitor.

2. The system of claim 1 wherein:
   (a) a pair of bellcranks are provided, each being pivotally connected at its opposite ends to opposite portions of one of said dual control means;
   (b) a separate power link is pivotally connected to each said bellcrank intermediate the ends of said bellcrank and adapted to receive an input from a pilot's control stick, and
   (c) a separate power servo is connected to each said power link opposite said bellcrank connection and to a control surface for actuating the same.

3. The system of claim 1 wherein said isolation means is a relay actuated switch and an electrically actuatable hydraulic by-pass valve associated with each said dual control means portion in a manner to isolate such control means portion from further operation as a portion of the system.

4. The system of claim 1 wherein each said pair of dual control means is connected to an opposite end of the same aerodynamic control surface for co-operatively positioning the same.

5. The system of claim 1 wherein said pairs of dual control means are connected to opposite control surfaces adapted for co-operatively accomplishing a single aerodynamic control function.

6. The system of claim 1 wherein a plurality of said systems are provided, one said system controlling the aerodynamic control surfaces for each of roll, pitch and yaw control.

7. A triple safety flight control system comprising:
   (a) first, second and third automatic pilot channels connected in parallel, each providing a substantially identical output;
   (b) first and second modulator means connected to co-operatively control the position of a single aerodynamic control surface, and third and fourth modulating means connected to co-operatively control the position of a single aerodynamic control surface, the controlled surfaces co-acting with one another in accomplishing a single aerodynamic control function, said first modulator means connected to and controlled by said first automatic pilot channel, said second and third modulator means connected to and controlled by said second automatic pilot channel, and said fourth modulating means connected to and controlled by said third automatic pilot channel;
   (c) a separate signal generating means connected to each said modulating means;
   (d) a signal monitor connected to said signal generating means for receiving and comparing signals therefrom; and
   (e) separate isolation means connected to each said modulating means for selectively isolating said modulating means from operation in the control system responsive to outputs from said monitor.

8. A triple safety flight control system comprising:
   (a) first, second and third automatic pilot channels connected in parallel to provide substantially identical outputs;
   (b) a first servo control for providing a first output to an aerodynamic control surface, said servo control including:
      (1) first and second hydraulic modulators connected for a common output to an aerodynamic control surface, and
      (2) a power servo operably disposed between said modulators and said control surface for increasing the power input to the control surface;
   (c) a second servo control identical to said first servo control for providing a second output to an aerodynamic control surface;
   (d) said first and second modulators of said first servo control respectively connected to and controlled by said first and second automatic pilot channels and said first and second modulators of said second servo control respectively connected to and controlled by said second and third automatic pilot channels;
(e) sensor means attached to receive inputs from said modulators and provide output signals proportional to modulator movement;
(f) a monitor connected to receive signals from said sensor means and adapted to compare such signals, determine the existence of faults within the system and provide isolation output signals; and
(g) a separate isolation means connected to said monitor and to each said modulator so as to selectively isolate faulty operating modulators from further operation in the system.

9. A triple safety flight control system comprising:
(a) first, second and third automatic pilot channels connected in parallel to provide substantially identical outputs;
(b) a first servo control for providing a first output to an aerodynamic control surface, said servo control including:
  (1) first and second hydraulic modulators,
  (2) a bellcrank having its ends pivotally connected to each said modulator for movement thereby,
  (3) a power link pivotally connected to said bellcrank intermediate said ends,
  (4) linkage adapted to be actuated by the pilot's control stick, pivotally connected to said power link intermediate its ends,
  (5) a power servo connected to said power link and to a control surface for providing said first output, and
  (6) means connected to said modulators and said power link for maintaining their predetermined positions in the absence of overriding forces;
(c) a second servo control identical to said first servo control for providing a second output to an aerodynamic control surface;
(d) said first and second modulators of said first servo control respectively connected to and controlled by said first and second automatic pilot channels and said first and second modulators of said second servo control respectively connected to and controlled by said second and third automatic pilot channels;
(e) a separate signal generator connected to each said modulator for providing signals proportional to movement of said modulators;
(f) a monitor connected to receive signals from said signal generators and adapted to compare such signals, determine the existence of faults within the system and provide isolation output signals; and
(g) a separate isolation means connected to said monitor and to each said modulator so as to selectively isolate faulty operating modulators from further operation in the system.

10. The system of claim 9 wherein said isolation means is a relay actuated switch and an electrically actuatable hydraulic by-pass valve associated with each said dual control means portion in a manner to isolate such control means portion from further operation as a portion of the system.

References Cited by the Examiner
UNITED STATES PATENTS

| | | | |
|---|---|---|---|
| 3,054,039 | 9/1962 | Meredith | 318—489 |
| 3,095,783 | 7/1963 | Flindt | 244—77 |
| 3,125,712 | 3/1964 | Meredith | 318—19 |

MILTON BUCHLER, *Primary Examiner.*

RALPH D. BLAKESLEE, *Examiner.*